US008095799B2

(12) United States Patent
Hauck et al.

(10) Patent No.: US 8,095,799 B2
(45) Date of Patent: Jan. 10, 2012

(54) TICKET AUTHORIZED SECURE INSTALLATION AND BOOT

(75) Inventors: Jerry Hauck, Windermere, FL (US); Michael Lambertus Hubertus Brouwer, San Jose, CA (US)

(73) Assignee: Apple Inc., Cupertino, CA (US)

( * ) Notice: Subject to any disclaimer, the term of this patent is extended or adjusted under 35 U.S.C. 154(b) by 501 days.

(21) Appl. No.: 12/329,377

(22) Filed: Dec. 5, 2008

(65) Prior Publication Data

US 2010/0023778 A1    Jan. 28, 2010

Related U.S. Application Data

(60) Provisional application No. 61/084,170, filed on Jul. 28, 2008.

(51) Int. Cl.
*H04L 29/06* (2006.01)
*H04L 9/32* (2006.01)
*G06F 21/00* (2006.01)

(52) U.S. Cl. .................... 713/182; 713/168; 713/150

(58) Field of Classification Search .................. 713/182, 713/168, 150
See application file for complete search history.

(56) References Cited

U.S. PATENT DOCUMENTS

2006/0064488 A1    3/2006    Ebert

FOREIGN PATENT DOCUMENTS

WO     WO 01/42889 A2    6/2001

OTHER PUBLICATIONS

Design of Boot Loader with Multiple Communication Port; Pei Ke; Zhang Gang; Li Fu-jiang; Computer Science and Software Engineering, 2008 International Conference on; vol. 2; Publication Year: 2008 , pp. 169-175.*
Optimizing the boot time of Android on embedded system; Singh, G.; Bipin, K.; Dhawan, R.; Consumer Electronics (ISCE), 2011 IEEE 15th International Symposium on; Publication Year: 2011 , pp. 503-508.*
A Fast-Boot Method for Embedded Mobile Linux: Toward a Single-Digit User Sensed Boot Time for Full-Featured Commercial Phones; Fuji, D.; Yamakami, T.; Ishiguro, K.; Advanced Information Networking and Applications (WAINA), 2011 IEEE Workshops of International Conference on; Publication Year: 2011 , pp. 81-85.*
PCT International Search Report and Written Opinion for PCT/US2009/051766, mailed Nov. 9, 2009, (12 pages).
European Search Report for Application No. EP 09 16 6473 mailed Nov. 11, 2009, (6 pages).

* cited by examiner

*Primary Examiner* — David Y Jung
(74) *Attorney, Agent, or Firm* — Blakely, Sokoloff, Taylor & Zafman LLP

(57) ABSTRACT

A method and apparatus for secure software installation to boot a device authorized by a ticket are described herein. A ticket request including a device identifier of the device is sent for the ticket which includes attributes for one or more components to boot the device into an operating state. The ticket is cryptographically validated to match the one or more components with corresponding attributes included in the ticket. If successfully matched, the one or more components are executed to boot the device.

21 Claims, 12 Drawing Sheets

```
Ticket ::= SEQUENCE {
            ticketAttributes TicketAttributes,
            signature SignatureValue,
            certificates Certificates }

TicketAttributes ::= SEQUENCE OF TLV          ← 1001

Certificates ::= SEQUENCE OF X509Certificate

LLBVersion ::= OCTET STRING

Digest ::= OCTET STRING

SignatureValue ::= OCTET STRING

TLV ::= IMPLICIT OCTET STRING  (user defined tags) ← 1003

Example Tags include:
        [0] ECID
        [1] ChipID
        [2] LLBVersionIdentifier
        [3] IBOOTDigest
        [4] AppleLogoDigest
        [5] DeviceTreeDigest
        [6] KernelCacheDigest
        [7] BatteryChargingDigest
        [8] BatteryLow0Digest
        [9] BatteryLow1Digest
        [10] RecoveryModeDigest
        [11] NeedsServiceDigest
        [12] Nonce
        [13] HostLLBVersionIdentifer
        [14] HostIBootDigest
        [15] iBSSVersionIdentifer
        [16] RestoreLogoDigest
        [17] RestoreDeviceTreeDigest
        [18] RestoreKernelCacheDigest
        [19] RestoreRamDiskDigest
        [20] RestoreASRDigest
```

Fig. 10

TICKET AUTHORIZED SECURE INSTALLATION AND BOOT

CROSS-REFERENCE TO RELATED APPLICATIONS

This application is related to, and claims the benefits of, U.S. Provisional Patent Application No. 61/084,170, filed on Jul. 28, 2008 entitled "Authorized Installation and Cross-Component Secured Boot", Jerry Hauck et al., which is hereby incorporated by reference herein in its entirety.

FIELD OF INVENTION

The present invention relates generally to installation and booting software of a device. More particularly, this invention relates to securely installing boot components and booting a device into an operating state authorized according to a received ticket.

BACKGROUND

As more and more computing devices are being used in people's daily life, security has become a widespread concern for users and content providers. Viruses, worms, Trojan horses, identity theft, software and media content piracy, and extortion using threats of data destruction are rampant. Usually, these attacks involve installing and executing malicious software codes to expose access to device resources that would otherwise be private to the system, the content provider, the user or an application.

An operating system may provide some security features to guard against such attacks. However, the security features of an operating system often fail to keep up with new attacks occurring on a daily basis. Moreover, when booting a computing device, security features may not yet be initialized and are vulnerable to bypass and/or tampering.

To reduce the possibility of system exploits, a secure boot system may be employed to require a signature verification for each production software image. Such a code audit measure, however, may not be completely bullet proof as the number of codes involved is usually very large and continues to increase.

Therefore, current security measures do not deliver a robust solution to protect applications and content inside a computing device, while at the same time providing the flexibility to update the software and or firmware for the device.

SUMMARY OF THE DESCRIPTION

A method and apparatus for secure software installation to boot a device authorized by a ticket are described herein. A ticket request including a device identifier of the device is sent for the ticket which includes attributes for one or more components to boot the device into an operating state. The ticket is cryptographically validated to match the one or more components with corresponding attributes included in the ticket. If successfully matched, the one or more components are executed to boot the device.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 10 is a sample format illustrating one example of a ticket to authorize boot components for booting a device;

DETAILED DESCRIPTION

Figure 1:
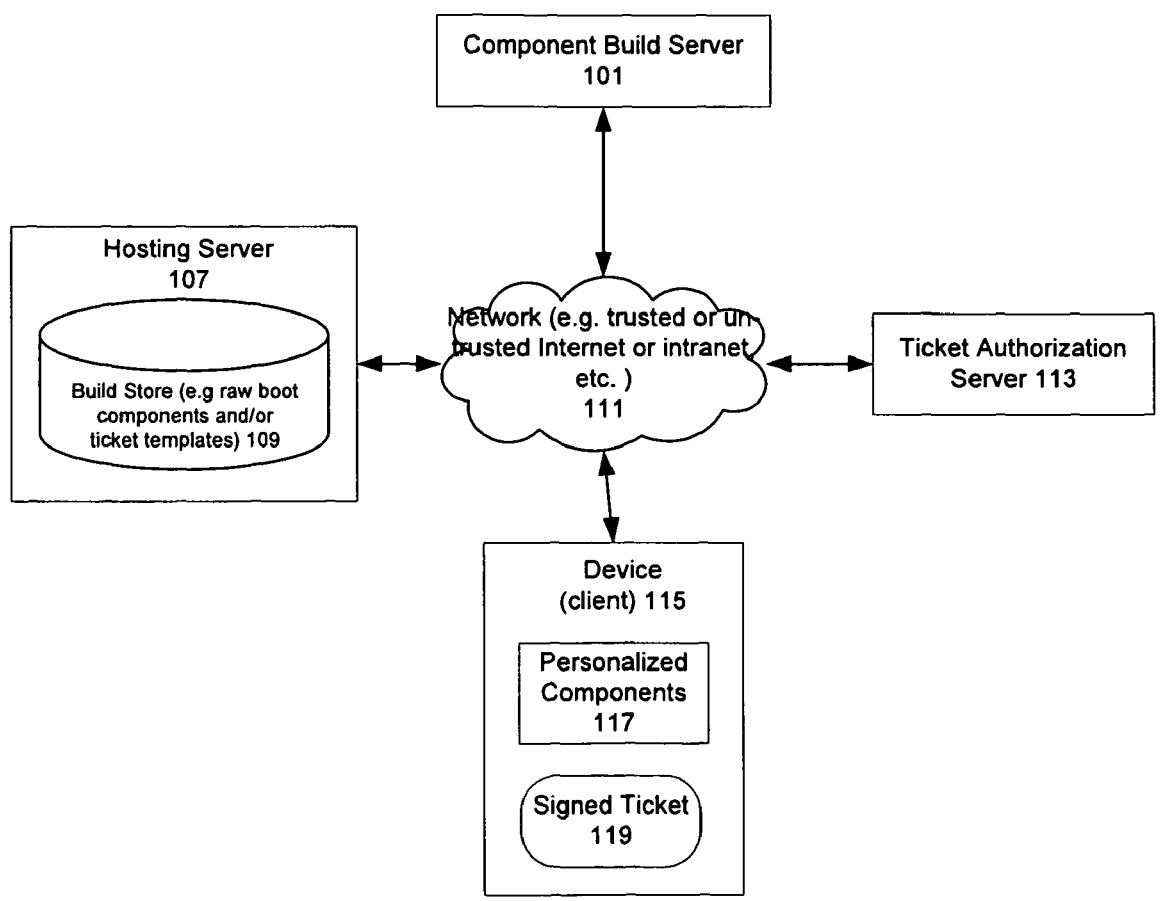
FIG. 1 is a block diagram illustrating one embodiment of networked systems to authorize installing boot components for securely booting a device according to tickets authorized.

A method and an apparatus for secure software installation to boot a device authorized by a ticket are described herein. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The term "host" and the term "device" are intended to refer generally to data processing systems rather than specifically to a particular form factor for the host versus a form factor for the device.

In one embodiment, a scheme is described herein, which allows developers to put the cat back in the bag so to speak, by requiring a per device digital signature to be created during installation time by a remote server. Thus if an exploit is found in a particular version of the software, the server can refuse to allow any unit to install that version. Furthermore, the server created personalized signature can protect the collection of installed boot components as a whole, thereby reducing potential exposure from mixing and matching of individually signed components. A boot component may be a software component for booting a device.

According to certain embodiments of the invention, there are potentially three primary security protections provided:

Prevent newly manufactured units from installing exploitable releases

Prevent existing in-field units from re-installing exploitable releases

Prevent arbitrary mixing and matching of signed components

The post-release revocation necessary to fulfill the first two protections may be accomplished by personalizing code signatures on a device-by-device basis. For example, using the Image3 foundation of the Apple ROM (Read Only Memory), individual devices may be prevented from executing any low level boot component that has not been personalized for the device. A per-device signature (unique to each device) is effectively created at install time by a remote server, thereby avoiding the security risks inherent with device-side signing and personalization. A server-side decision to withhold or securely maintain the necessary personalization of a given release then amounts to revocation of that release's installer, at least from the perspective of newly manufactured units. Incorporation of a device generated random nonce into the server exchange may eliminate replay of previous installations on in-field units.

The server generated personalization includes the creation of a "ticket". A ticket may provide a collection of expected hashes and version identifiers for each component in the secure boot and recovery processes. The collection is personalized to a given unit via a device unique identifier. The full collection, including personalization, may be protected with a single signature. Once delivered to the unit (e.g., electronic device) and validated, the ticket may serve as the central authority on the expected and allowed component versions that define a particular release for the device. By validating subsequent boot time measurements of each stage against the corresponding values in the central ticket, the device may abdicate authority for the mixing and matching of components to the server.

Flexible policies maintained in the server side personalization and authorization functions may address a number of security and logistical concerns, e.g. related to P2 versions of systems. For example, specialized software is not required to run unverified or third party codes. Additionally, rich whitelisting on the server can turn production units into development units and vice versa, or can quickly restrict the population of devices that can run a given carrier or debug build.

FIG. 1 is a block diagram illustrating one embodiment of networked systems 100 to authorize installing boot components for securely booting a device according to tickets authorized. Networked systems 100 may include one or more servers coupled to a device via trusted and/or un-trusted networks to provide boot components authorized by a ticket for booting the device. In one embodiment, network systems 100 include a component build server 101 which may generate different builds of operating environments for a device 115. Each build may include multiple boot components of various versions. When a build is released from the component build server 101, the component build server 101 may generate ticket signing authorizations to configure a ticket authorization server 113. A ticket signing authorization may include instructions specifying which versions of boot components and/or combinations of boot components are allowed for a particular device, e.g. based on a device identifier and/or a device class identifier etc.

In one embodiment, operational policies determine the kinds of ticket signing authorizations issued. Operational policies may include production policies, internal policies, factory policies, and other optional policies. With respect to production policies, only a component build server, such as component build server 101, will issue ticket signing authorizations for production. A production ticket signing authorization may not include device whitelists nor wildcard digests, thus requiring a device class as well as all the digests in a ticket request to match those in the ticket signing authorization. For internal policies, internal ticket signing authorizations may include wildcard digests and/or a whitelist of devices for internal use to allow a device to install and run any software. Typically, ticket authorization servers with internal ticket signing authorizations may be accessible only on an internal network or via a secured communication channel. A wildcard digest may match a ticket request regardless of actual digest/hash values included in the ticket request. A whitelist of devices in a signing authorization may issue a ticket for a device only if the unique identifier of the device is present in the whitelist.

For the factory policies, factory ticket signing authorizations may include wildcard digests for selected boot components (e.g. a kernelcache component and a NOR diagnostic component) to allow a device to install released software regardless which versions of the selected boot components are currently running in the device. A factory authorization server with a factory ticket signing authorization may not be accessible outside a factory. New policies may be created on the fly by creating ticket signing authorizations with either limited validity dates or white listed units (e.g. carrier drops can only run on a preset list of devices).

When a ticket authorization server 113 is configured, a configuration data may be updated according to a ticket signing authorization received. In one embodiment, the component build server 101 and the ticket authorization server 113 are communicatively coupled via a trusted network connection 111. A network may be physically located in a secure location to be trusted. Or, a network may be trusted according to secure connections based on cryptographic protocols, e.g. SSL (Secure Socket Layer), PVN (Private Virtual Networking), or other secure connections.

In one embodiment, a hosting server 107 may download builds released from the component build server 101 via a network 111, which may be an un-trusted network, e.g. internet or intranet. A build store 109 in the hosting server may store downloaded builds. Each build may include a group of raw boot components. In one embodiment, the component build server 101 sends ticket templates to be stored in the hosting server 107. A ticket template may include one or more identifiers of raw boot components for a single build and/or across multiple builds (mix-and-match). In one embodiment, identifiers of a boot component may include a cryptographic digest generated from contents of the boot component and/or a version number. A ticket template may include identifiers of boot components stored in the hosting server 107, e.g. based on a particular build released from the component build server 101. A raw boot component may be a boot component not personalized for a particular device. In one embodiment, a device 115 may download boot components required to boot the device 115 from the hosting server 107 over an open network 111, such as the internet. For example, the device 115 may periodically send inquires to the hosting server 107 about availability of new builds (e.g. based on a version number associated with the device 115) to download associated raw boot components and/or ticket templates when available.

Typically, the device 115 can boot into an operating state according to a group of one or more personalized components 117 stored (e.g. in a flash) inside the device 115. In one embodiment, a personalized component for a device may be based on a raw boot component encrypted uniquely, i.e. personalized, for the device. The group of personalized components 117 may be based on a combination of raw boot components downloaded from the hosting server selected from a build and/or across different builds specifically for the device 115, for example, according to a signed ticket 119. In one embodiment, the device 115 sends a ticket request, for example, including a raw ticket downloaded from the hosting server 107, to a ticket authorization server 113 over the open network 111 to personalize the device 115 for booting. The ticket authorization server 113 may determine the group of personalized components 117 for the device 115 to generate a ticket as configured according to authorizations received from the component build server 101. The signed ticket 119 may include a signature cryptographically signed by the ticket authorization server 113.

Figure 2:
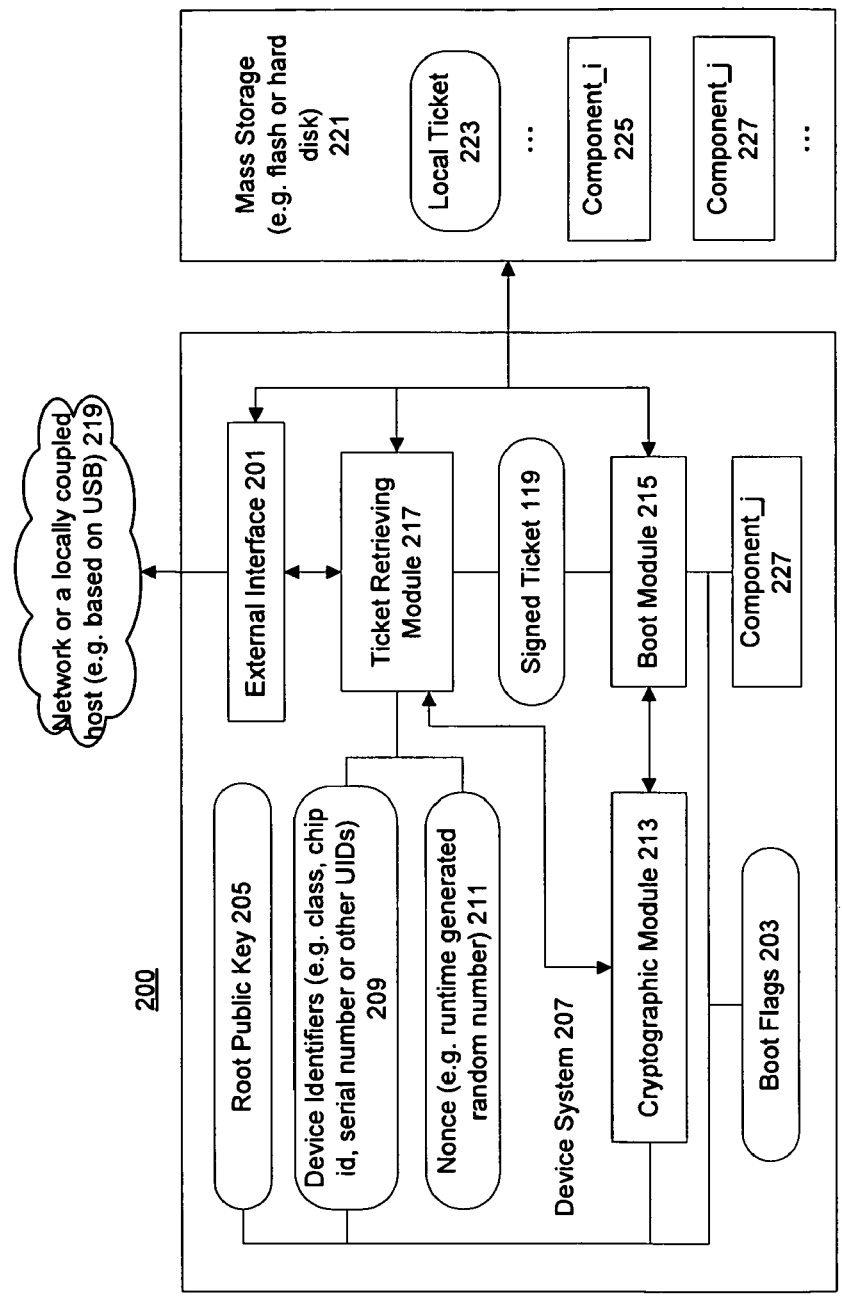
FIG. 2 is a block diagram illustrating one embodiment of system components to receive an authorized ticket to install boot components for booting a device.

FIG. 2 is a block diagram illustrating one embodiment of system 200 components to receive an authorized ticket to install boot components for booting a device. System 200 may be hosted in a device such as device 115 of FIG. 1. In one embodiment, system 200 includes a device system 207 stored in a memory, e.g. a RAM and/or ROM, coupled to a mass storage 221, e.g. a flash. Device system 207 may be coupled with a remote server, such as a hosting server 107 or a ticket authorization server 113 of FIG. 1, over a network 219 via an external interface 201. In one embodiment, the device system 207 may be locally coupled to a host device, e.g. using an USB (Universal Serial Bus) connection via the external interface 201.

The device system 207 may include a root public key 205 preinstalled for a well known security authority, e.g. during device manufacturing in a factory, according to public key cryptography. Additionally, the device system 207 may include one or more device identifiers 209 such as a chip identifier, a chip serial number, a device class identifier or other UIDs (unique identifiers). Device identifiers may be stored in a non-volatile storage in a device. A UID of a device may be accessible restrictively within a ROM of the device. An additional unique identifier of the device system 207 may be derived by combining more than one identifiers from the device identifiers 209, e.g. the chip identifier and the chip serial number. In one embodiment, the mass storage 221 may store a local ticket (or local boot ticket) 223 and one or more boot components, e.g. component_i 225 and component_j 227 for booting the device system 207. The local ticket 223 may be associated with a current operating environment of the device system 207. Component_i 225 and component_j 227 may be raw boot components (not yet validated and/or personalized) downloaded from a hosting server, such as hosting server 107 of FIG. 1.

In one embodiment, the device system 207 includes a ticket retrieving module 217, a cryptographic module 213 and a boot module 215. The cryptographic module 213 may include implementations of cryptographic operations based on, e.g. SHA (Secure Hashing Algorithm) hashing functions such as SHA-1, SHA-224, SHA-256, SHA-384, and SHA-512, data encrpyting algorithms such as AES (Advanced Encryption Standard) encryption, and/or public key cryptography such as RSA (Ralph Shamir Adelman) public key cryptography. A ticket retrieving module 217 may send a ticket request to an authorization server, such as ticket authorization server 113 of FIG. 1, to authorize a ticket for booting the device system 207. In one embodiment, the ticket retrieving module 217 sends a ticket request in response to an external command received via the external interface 201. The ticket retrieving module 217 may generate one or more random numbers (e.g. a separate nonce for a baseband system inside the device), such as nonce 211, on the fly for a ticket request. In one embodiment, a ticket request may include one or more fields a device (or unit) would access in a signed ticket when performing an installation to boot the device. For example, the fields in a ticket request may include identifiers for a device, such as device identifiers 209, a generated random number, such as nonce 211, and/or a map of generic component names (or generic IDs) and corresponding unique component identifiers (e.g. a cryptographic digest generated from a named component). A device identifier in a ticket request may be derived from one or more identifiers stored in the device, such as a combination of a serial number and a chip identifier from device identifiers 209. In some embodiments, a ticket request also includes metadata to provide an authorization server (or ticket signing server), such as ticket authorization server 113 of FIG. 1, to determine which policy (e.g. a group of constraints regarding which components are allowed) to apply for generating a signed ticket. In response to a signed ticket 119 received, e.g. from a ticket authorization server 113, the ticket retrieving module 217 may call the cryptographic module 213 to verify whether the signed ticket 119 is authentic based on a root public key 205 and/or the nonce 211 as generated for a corresponding ticket request. The ticket retrieving module 217 may store a successfully validated ticket in the mass storage 221.

According to one embodiment, the boot module 215 performs one or more boot operations including loading a boot component, such as component_j 227 from the mass storage 221. Alternatively the boot module 215 may receive a boot component externally from the external interface 201. The boot module 215 may call the cryptographic module 213 to validate a boot component, such as component_j 227, according to the signed ticket 119, the device identifiers 209 and/or the root public key 205. In one embodiment, boot operations are associated with values set in boot flags 203. The boot module 215 may update boot flags 203 when performing boot operations. In some embodiments, the boot module 215 calls the cryptographic module 213 to personalize (e.g. encrypt) a validated boot component according to the device identifiers 209 to store the validated boot component into the mass storage 221. Boot operations implemented in the boot module 215 may include activating a validated boot module, such as in component_j 227.

Figure 3:
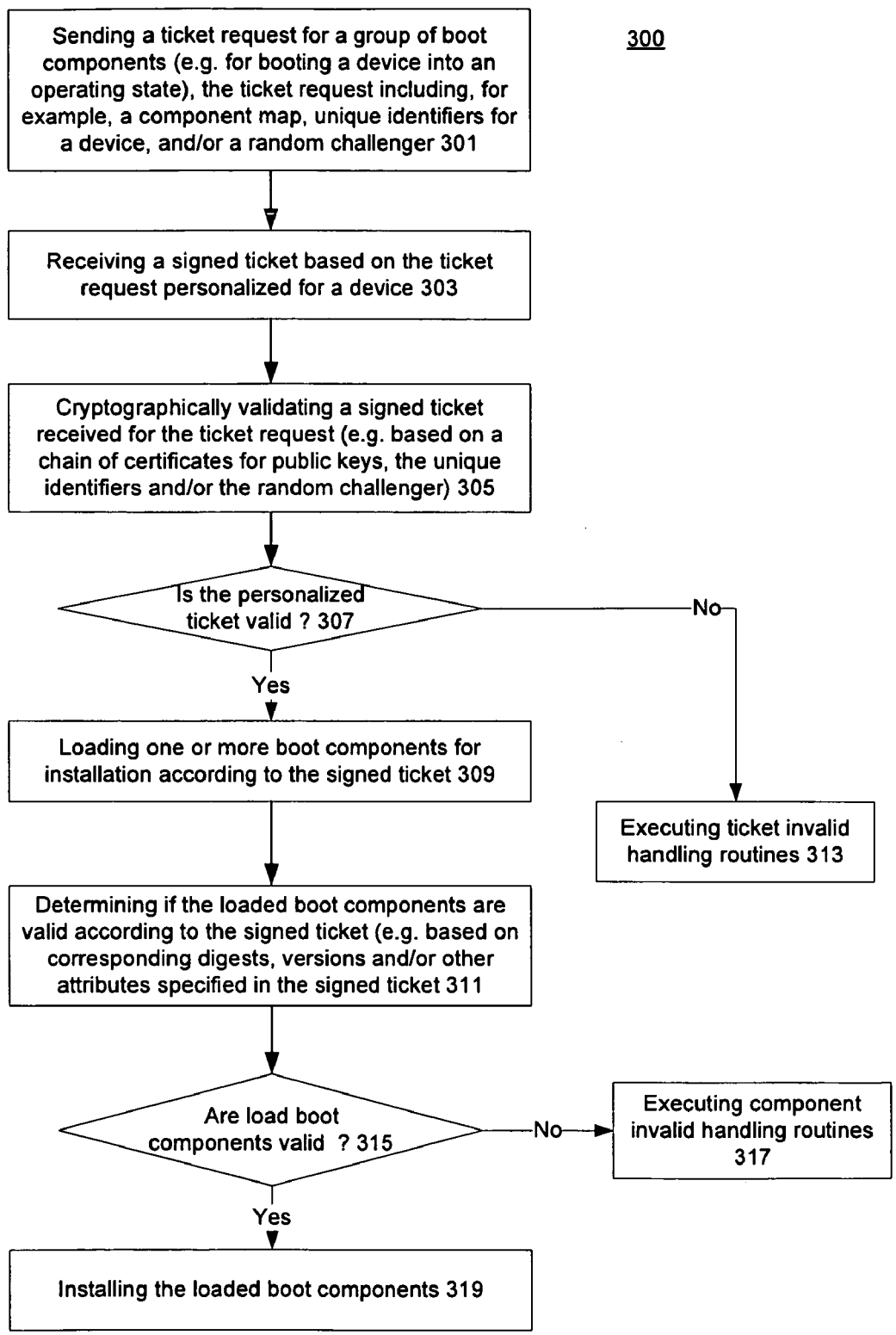
FIG. 3 is a flow diagram illustrating one embodiment of a process for installing boot components authorized by a ticket.

FIG. 3 is a flow diagram illustrating one embodiment of a process 300 for installing boot components authorized by a ticket. Exemplary process 300 may be performed by a processing logic that may comprise hardware (circuitry, dedicated logic, etc.), software (such as is run on a dedicated machine), or a combination of both. For example, process 300 may be performed by the device system 207 of FIG. 2. In one embodiment, at block 301, the processing logic of process 300 sends a ticket request to a predetermined remote server, such as the authorization (or ticket signing) server 113 of FIG. 1, for a group of (software) components to boot a device into an operating state. The processing logic of process 300 may generate a ticket request for booting a device according to a boot mode set in the device, such as boot flags 203 of FIG. 2. A ticket request may include one or more fields, such as name (or attribute) value pairs. A field in a ticket request may correspond to an identifier for a device, such as device identifiers 209 of FIG. 2. In one embodiment, a name value pair specifies expected boot components to boot a device to map a component identifier (name) and a digest (value) generated from the component. A digest may by a unique cryptographic value, such as a hash of binary codes in a boot component. In one embodiment, the processing logic of process 300 generate one or more fields for a ticket request based on a ticket template retrieved from a storage device, such as mass storage 221 of FIG. 2. The processing logic of process 300 may generate a random number as a random challenger to be included in a ticket request. The generated random number may be stored temporarily in a device, such as nonce 211 of FIG. 2. Each ticket request may be uniquely associated with a different random number.

Subsequently at block 303, the processing logic of process 300 may receive a signed ticket from a ticket authorization server in response to the ticket request. A signed ticket may include a collection of fields personalized for a device according to a ticket request. For example, a ticket authorization server may determine whether a boot component specified according to a field of a ticket request is allowed for a device identified in the ticket request (e.g. based on a class and/or one or more unique identifiers for the device according to a configured policy). In some embodiment, the ticket authorization server may insert a field to specify a boot component not referenced in a corresponding ticket request. Alternatively, the ticket authorization server may specify in a signed ticket a boot component identified in the corresponding ticket request but associated with attribute values different from those included in the ticket request, e.g. different versions with different digest values. Thus, personalized tickets may specify different collections of boot components for different devices.

At block 305, in one embodiment, the processing logic of process 300 validates a received signed ticket. Significantly, a signed ticket may include a signature cryptographically signed by a ticket authorization server. In one embodiment, a ticket authorization server may encrypt a signed signature using a unique identifier for a device (e.g. included in a ticket request) to personalize the signed signature. The processing logic of process 300 may perform cryptographic operations on a signed ticket according to, for example, cryptographic module 213 of FIG. 2. In one embodiment, the signed ticket includes a certificate or a chain of certificates. The processing logic of process 300 may validate a certificate included in a signed ticket according to a trusted key already stored in a device, such as a root public key 205 of FIG. 2, to verify a digest generated from the signed ticket against an included signature. In one embodiment, a signed ticket personalized for a device include a signature and a certificate encrypted by separate identifiers for the device, for example, according to a series number and a chip identifier for the device respectively. Additionally, a signed ticket may include a random challenger (a number). The processing logic of process 300 may compare a random challenger included in a signed ticket with a nonce stored in a device, such as nonce 211 of FIG. 2 to determine the validity of the signed ticket, e.g. whether the nonce matches the random challenger.

At block 309, if the signed ticket is determined valid at block 307, the processing logic of process 300 may load one or more boot components for installation according to the signed ticket. For example, the processing logic of process 300 may load into a memory a boot component identified in the signed ticket. In one embodiment, the processing logic of process 300 loads a boot component from a local storage, such as mass storage 221 of FIG. 2. Alternatively, the processing logic of process 300 may load a boot component as received from an external source, e.g. a locally coupled host device using USB. The processing logic of process 300 may select one of boot components specified in a signed ticket to load according a predetermined order. If the signed ticket is determined not valid at block 307, the processing logic of process 300 may proceed to execute invalid ticket handling routines at block 313, e.g. update flags, such as boot flags 203 of FIG. 2, to indicate a boot failure.

At block 311, the processing logic of process 300 may determine if one or more loaded boot components are valid. In one embodiment, the processing logic of process 300 compares a cryptographic digest of the boot component with a corresponding digest specified in the signed ticket. The processing logic of process 300 may generate a cryptographic digest, for example, according to hash functions performed by cryptographic module 213 of FIG. 2. In some embodiments, a field including a digest of a boot component in a signed ticket may be personalized (e.g. encrypted) according to a unique identifier of a device. The processing logic of process 300 may compare a version number specified in the signed ticket for the loaded boot component with a version number included in the loaded boot component (e.g. in a header). Other attributes of the loaded boot component may be compared as specified in the signed ticket. The processing logic of process 300 may invalidate a loaded boot component if any attribute associated with the boot component does not match a corresponding attribute specified in a signed ticket.

Figure 4:
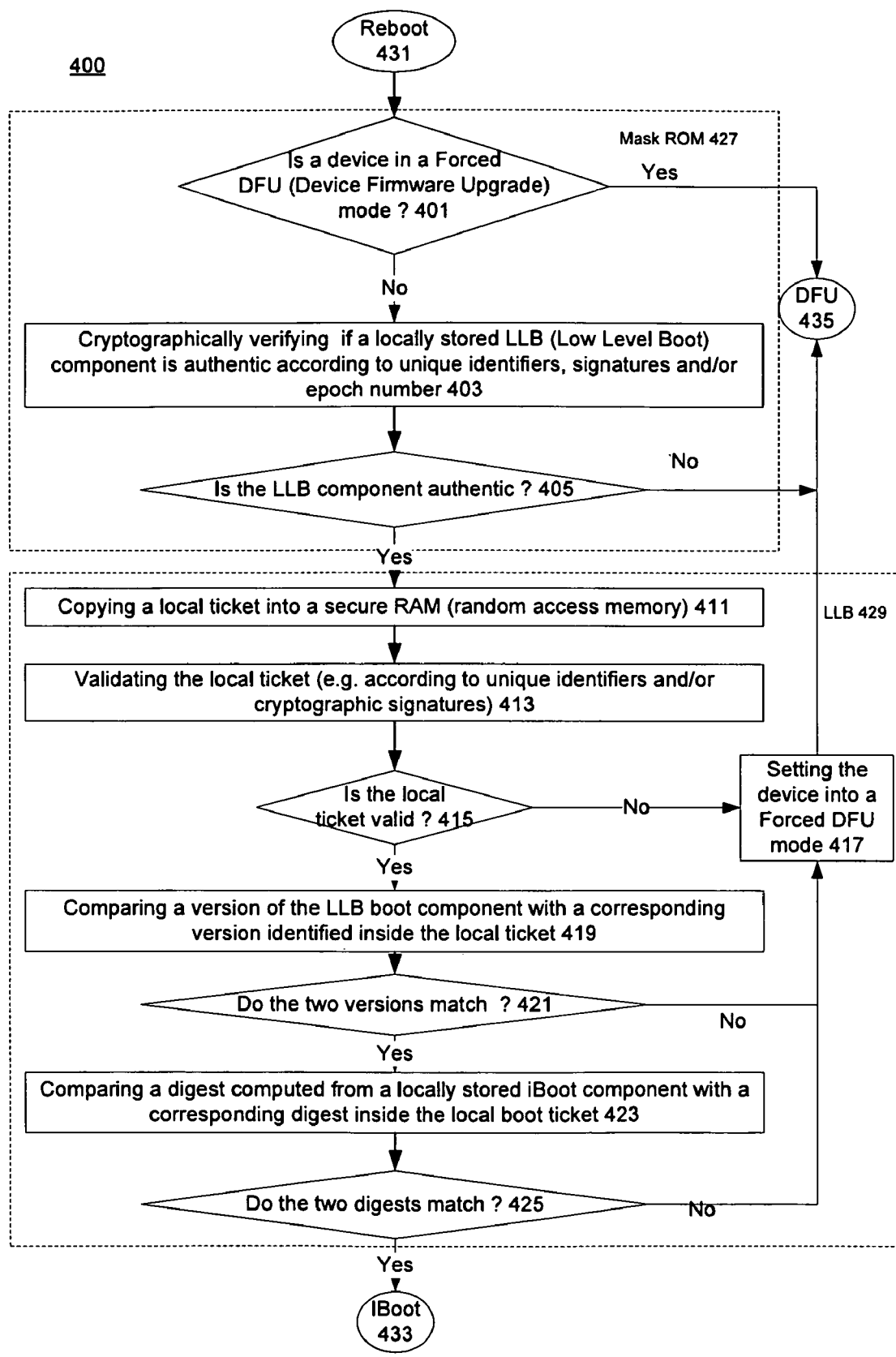
FIG. 4 is a flow diagram illustrating one embodiment of a process to boot a device based on a ticket.

If the loaded boot components are valid at block 315, in one embodiment, the processing logic of process 300 installs the loaded boot components into the system at block 319. Installing a boot component may include personalizing the boot component to be stored in a mass storage device, e.g. mass storage 221 of FIG. 2. The processing logic of process 300 may encrypt a boot component to personalize the boot component, e.g. according to a unique identifier of a device, such as derived from device identifiers 209 of FIG. 2. In one embodiment, installing a boot component includes executing the boot component for booting a device. Executing a boot component for booting a device may include passing a signed ticket as an argument for the boot component. If a loaded boot component is determined not valid at block 315, the processing logic of process 300 may proceed to execute invalid component handling routines at block 317, e.g. update flags, such as boot flags 203 of FIG. 2, to indicate a boot failure FIG. 4 is a flow diagram illustrating one embodiment of a process 400 to boot a device based on a ticket. Exemplary process 400 may be performed by a processing logic that may comprise hardware (circuitry, dedicated logic, etc.), software (such as is run on a dedicated machine), or a combination of both. For example, process 400 may be performed by some components of system 200 of FIG. 2. At block 401, in one embodiment, the processing logic of process 400 determines a boot mode for a device, e.g. according to settings of boot flags 203 of FIG. 2. If the device is in a DFU (Device Firmware Upgrade) mode, in one embodiment, the processing logic proceeds to perform DFU operations 435. Otherwise, the processing logic of process 400 may verify cryptographically if a locally stored LLB (Low Level Boot) component is authentic at block 403. An LLB component may be a boot component for booting a device. When stored locally in a device, e.g. in mass storage 221 of FIG. 2, an LLB component may be encrypted using a UID, e.g. in device identifiers 209 of FIG. 2. An UID for a device may be accessible strictly within a ROM of the device. In one embodiment, an executable boot component, such as an LLB component, includes a version identifier, a certificate and/or a signature cryptographically signed by a trusted authority, e.g. based on a (signed or unsigned) digest. The processing logic of process 400 may compare an epoch number stored in a device (e.g. based on hardware settings) with the version identifier included an LLB component to determine if the LLB component is authentic. For example, an LLB component with a version identifier smaller than an epoch number stored in a device may not be allowed to execute in the device.

If an LLB is determined as authentic at block 405, in one embodiment, the processing logic of process 400 copies a local ticket (a locally stored boot ticket) into a secure RAM at block 411 from a storage device, such as mass storage 221 of FIG. 2. The processing logic of process 400 may validate the local ticket at block 413, for example, according to similar operations as performed by the processing logic of process 300 at block 305 of FIG. 3. If the local ticket is determined not valid at block 415, the processing logic of process 400 may update a device setting, such as in boot flags 203 of FIG. 2, to force the device into a DFU mode at block 417. Otherwise, at block 419, the processing logic of process 400 may compare a version identifier of the LLB component to a version specified in the local ticket according to a field corresponding to the LLB component. If the LLB component does not include a matching version with the local ticket at block 421, the processing logic of process 400 may configure the device into a DFU mode at block 417. Otherwise, in one embodiment, at block 423, the processing logic of process 400 may generate a cryptographic digest from an iBoot component located in a local storage device, such as mass storage 221 of FIG. 2, to generate a digest to compare with a corresponding digest specified in the local ticket. An iBoot component may be a boot component for a second stage boot loader.

At block 425, if the generated digest for the iBoot component matches with the digest specified in the local ticket, the processing logic of process may proceed to perform IBoot operations 433 (e.g. executing the iBoot component) to boot the device. Otherwise, the processing logic of process 400 may enter the device into a DFU mode at block 417. In one embodiment, if an LLB component is determined invalid, e.g. cannot be verified as in block 405, or incorrect, e.g. versions fail to match as in block 421, the processing logic of process 400 may invalidate a signature included in the LLB component, or remove the LLB component from a local storage device. In some embodiments, portions of the processing logic of process 400 may be implemented inside a mask ROM 427 or the LLB component 429.

Figure 5:
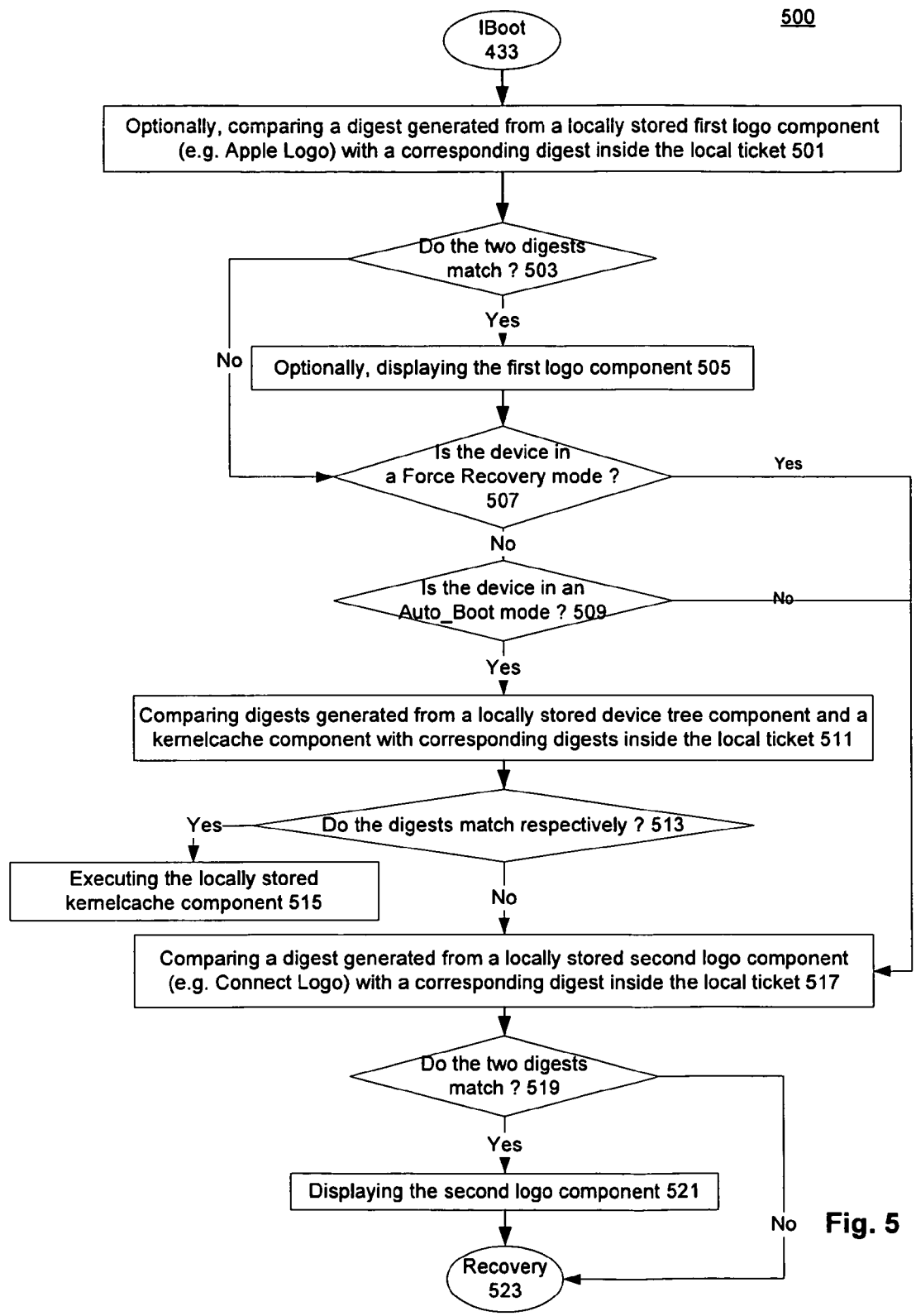
FIG. 5 is a flow diagram illustrating one embodiment of a process to install boot components authorized by a ticket to boot a device.

FIG. 5 is a flow diagram illustrating one embodiment of a process 500 to install boot components authorized by a ticket to boot a device. Exemplary process 500 may be performed by a processing logic that may comprise hardware (circuitry, dedicated logic, etc.), software (such as is run on a dedicated machine), or a combination of both. For example, process 500 may be performed by some components of system 200 of FIG. 2. In one embodiment at block 501, the processing logic of process 500 compares a digest generated from a first logo component, e.g. including an image of a company logo, with a corresponding digest specified in a local ticket, such as the verified local ticket at block 419 in process 400 of FIG. 4. If the two digests match at block 503, the processing logic of process 500 may display the first logo component at block 505. Otherwise, the processing logic of process 500 may determine if a device is in an FR (Force Recovery) mode, for example, according to device settings of boot flags 203 of FIG. 2. If the device is not in an FR mode, the processing logic of process 500 may determine, e.g. based on device settings, if the device is in an AB (Auto_Boot) mode at block 509.

If the device is determined to be in an AB mode, in one embodiment at block 511, the processing logic of process 500 may generate a device tree digest and a kernelcache digest respectively from a device tree component and a kernelcache component stored locally, e.g., in mass storage device 221 of FIG. 2. A device tree component and a kernelcache component may be boot components for booting a device. In one embodiment, the processing logic of process 500 may compare the device tree digest and the kernelcache digest with corresponding digests specified in a local ticket. If both digests match the corresponding digests in the local ticket, the processing logic of process 500 may execute the kernelcache component at block 515, including, for example, passing the local ticket as a parameter. If either match fails at block 513, or the device is in a FR mode at block 507, or the device is neither in an FR mode nor in an AB mode at block 509, the processing logic of process 500 may compare a digest generated from a second logo component, e.g. including an image of a boot status logo, with a corresponding digest specified in the local ticket at block 517. If the two digests match at block 519, the processing logic of process 500 may display the second logo component at block 521. Otherwise, the processing logic of process 500 may proceed to perform recovery operations to boot the device at block 523. In one embodiment, portions of the processing logic of process 500 may be implemented in an iBoot component.

Figure 6:
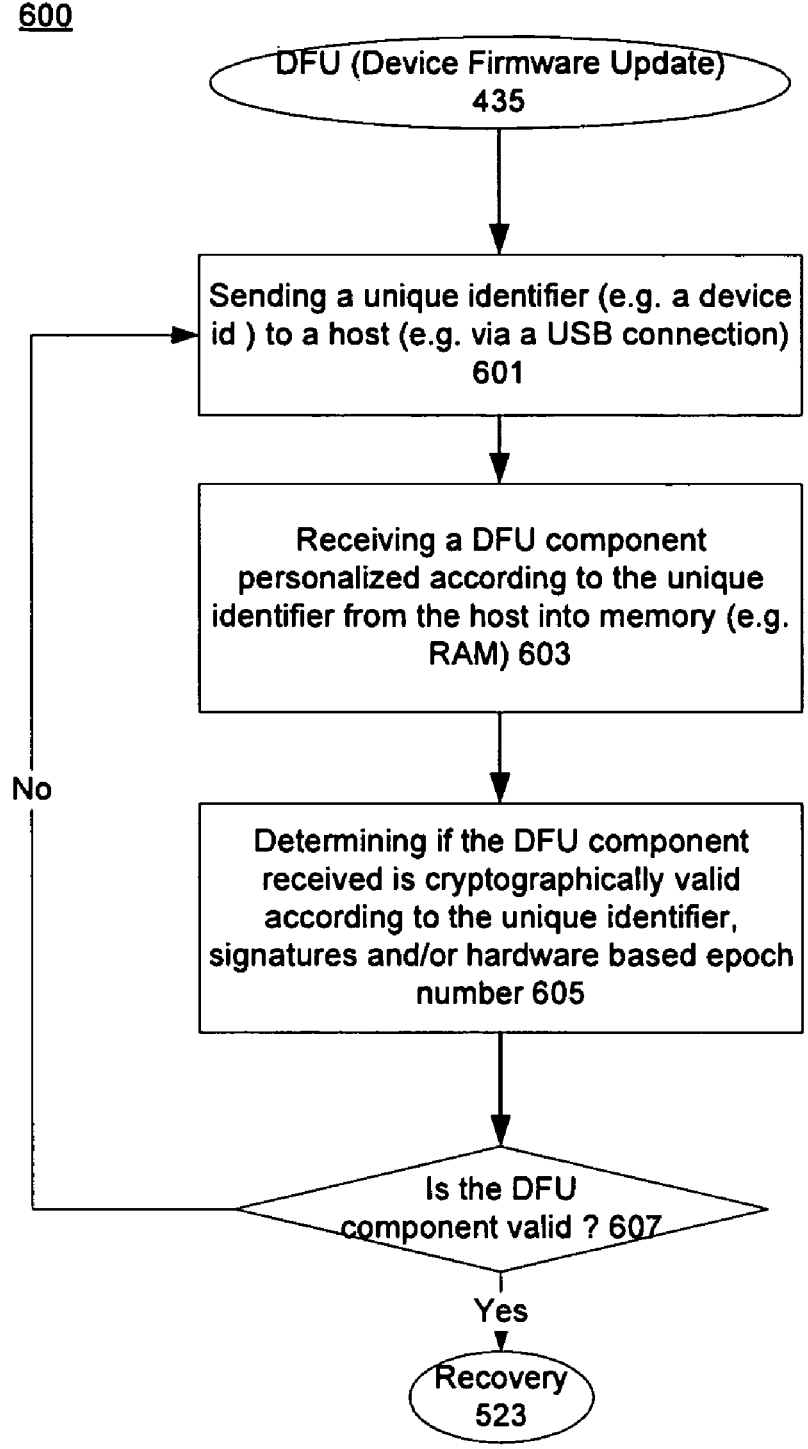
FIG. 6 is a flow diagram illustrating one embodiment of a process to validate a boot component personalized for a device.

FIG. 6 is a flow diagram illustrating one embodiment of a process 600 to validate a boot component personalized for a device. Exemplary process 600 may be performed by a processing logic that may comprise hardware (circuitry, dedicated logic, etc.), software (such as is run on a dedicated machine), or a combination of both. For example, process 600 may be performed by some components of system 200 of FIG. 2. In one embodiment, the processing logic of process 600 performs operations for booting a device in a DFU mode coupled to a host device, such as a MAC (Macintosh) computer, via a USB connection. At block 601, the processing logic of process 600 sends a unique identifier for a device, e.g. based on device identifiers 209 of FIG. 2, to a host device including indicators indicating that the device is in a DFU mode.

Subsequently at block 603, the processing logic of process 600 may receive a DFU component from the host into a memory (e.g. a RAM of the device). The DFU component may be personalized (e.g. encrypted) according the unique identifier. In one embodiment, a DFU component is a boot component for booting a device, such as an iBoot component or an iBSS component (including an LLB component and an iBoot component without mass storage support). At block 605, the processing logic of process 600 may determine if the received DFU component is valid, e.g. performing operations similar to process 400 at block 403 of FIG. 4. If the DFU component is determined as not valid at block 607, the processing logic of process 600 may again send the unique identifier to the coupled host proceeding back at block 601. Otherwise, if the DFU component is valid, the processing logic of process 600 may continue performing recovery operations 523 for booting the device. In one embodiment, the processing logic of process 600 may be implemented in boot components loaded inside a mask ROM of a device.

Figure 7:
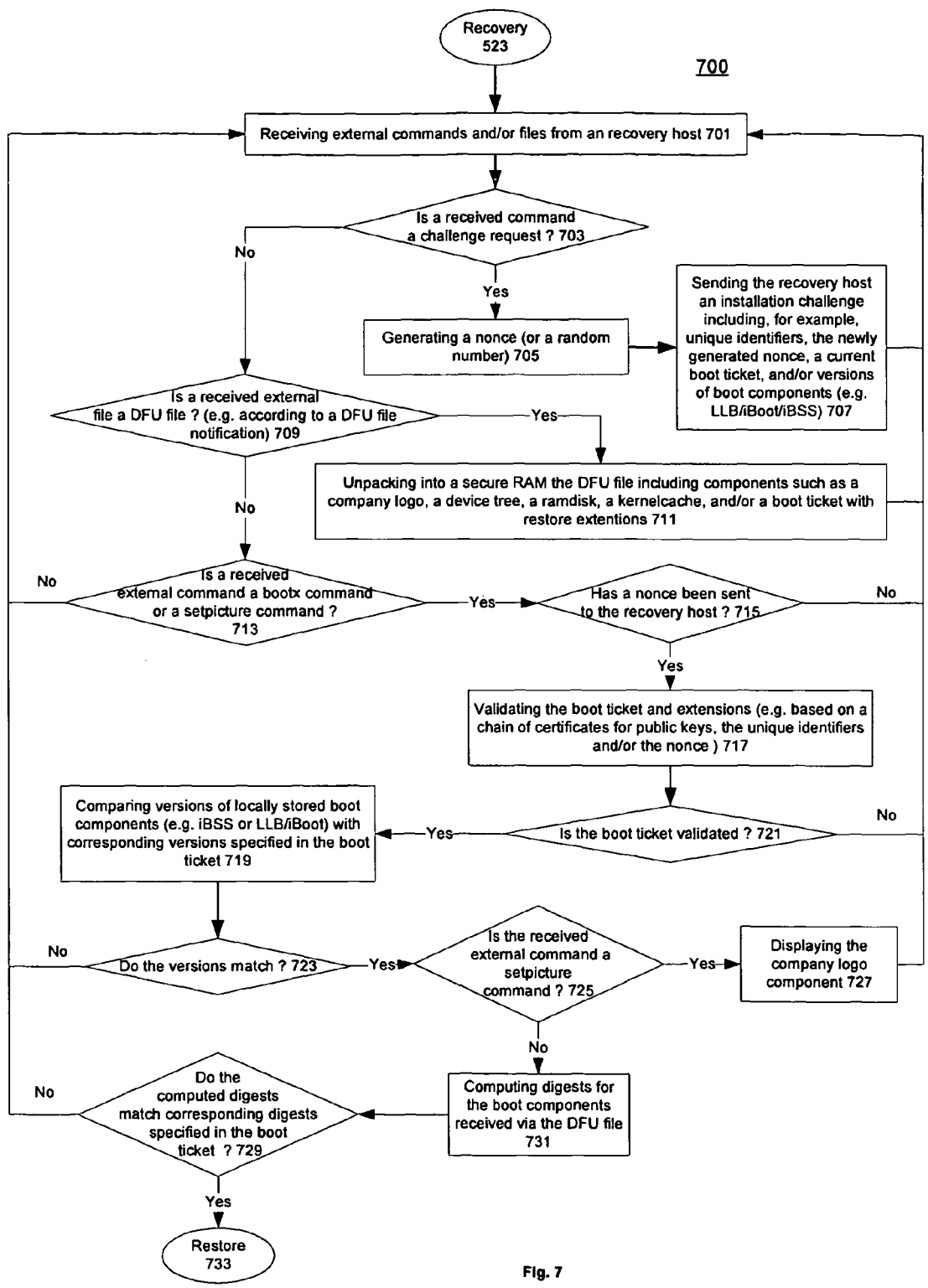
FIG. 7 is a flow diagram illustrating one embodiment of a process to request a ticket authorizing boot components for booting a device.

FIG. 7 is a flow diagram illustrating one embodiment of a process 700 to request a ticket authorizing boot components for booting a device. Exemplary process 700 may be performed by a processing logic that may comprise hardware (circuitry, dedicated logic, etc.), software (such as is run on a dedicated machine), or a combination of both. For example, process 700 may be performed by some components of system 200 of FIG. 2. In one embodiment, the processing logic of process 700 performs recovery operations 523 for booting a device. At block 701, the processing logic of process 700 may receive commands and/or files externally from a recovery host, e.g. locally coupled with a device via USB connections. The processing logic of process 700 may detect if a received command is a challenge request at block 703. If a received command is a challenge request, at block 705, the processing logic of process 700 may generate a nonce (or a random number). In one embodiment, the processing logic of process 700 stores a generated nonce locally in a device, such as nonce 211 of FIG. 2. The processing logic of process 700 may set a flag value, such as a nonce_generated flag when a nonce is generated. At block 707, the processing logic of process 700 may send an installation challenge to the recovery host. An installation challenge may include unique identifiers for a device (e.g. a device ID), a nonce generated by the device, a current boot ticket in the device, and/or version numbers of one or more boot components (e.g. an LLB, and iBoot or an iBSS component currently loaded in the device). A current boot ticket may be a boot ticket currently loaded in a memory of a device, e.g. based on a local ticket retrieved from a storage device, such as mass storage 221 of FIG. 2. In one embodiment, a recovery host is communicatively coupled remotely via network connections with a ticket authorization server, such as ticket authorization sever 113 of FIG. 1. A recovery host may send a ticket authorization server a ticket request generated according to an installation challenge received from a locally coupled device.

If a received command is not a challenge request at block 703, the processing logic of process 700 may determine, at block 709, if the received command is a DFU file notification indicating a file received from a recovery host is a DFU file. If a DFU file has been received, the processing logic of process 700 may unpack the DFU file into a secure RAM at block 711. A DFU file may include boot components, such as a company logo, a device tree, a ramdisk, a kernelcache component and/or a boot ticket having restore extensions. A boot ticket may include a field as a restore extension for specifying a boot component, e.g. a ramdisk, for a device to perform restore operations for booting.

If a received external file is not a DFU file at block 709, the processing logic of process 700 may determine if a received external command (e.g. from a recovery host) is one of a predetermined group of commands (e.g. a bootx command or a setpicture command). If the received external command is not one of the predetermined group of commands at block 713, the processing logic of process 700 may continue receiving external commands and/or files at block 701. Otherwise, the processing logic of process 700 may check if a nonce has been sent to the recovery host at block 715, e.g. based on a flag value, such as a nonce_generated value in boot flags 203 of FIG. 2. If a nonce has not been sent to the recovery host at block 715, the processing logic of process 700 may continue receiving external commands and/or files at block 701. Otherwise, at block 717, the processing logic of process 700 may validate a boot ticket (including extensions), e.g. a boot ticket received from the recovery host. In one embodiment, the processing logic of process 700 performs cryptographic operations similar to process 300 at block 305 of FIG. 3 to determine if a boot ticket is valid.

If the boot ticket is not validated at block 721, the processing logic of process 700 may continue receiving external commands and/or files at block 701. Otherwise, at block 719, the processing logic of process 700 may compare versions of one or more boot components locally stored in a device with corresponding versions specified in the boot ticket (e.g. a boot ticket received from a recovery host). In one embodiment, the processing logic of process 700 unsets a flag, such as the nonce_generated flag, if the boot ticket is validated. In case any mismatch is identified at block 723, the processing logic of process 700 may continue receiving external commands and/or files at block 701. Otherwise, the processing logic of process 700 may determine if a received external command (e.g. from a recovery host) is a setpicture command at block 725. In one embodiment, the processing logic of process 700 replaces the current boot ticket in the memory with the received boot ticket if no mismatch is identified at block 723.

If the received external command is a setpicture command at block 725, the processing logic of process 700 may display a company logo according to a company logo component, e.g. received from a recovery host in a DFU file at block 727. Otherwise, the processing logic of process 700 may compute (or generate) cryptographic digests, e.g. according to cryptographic module 213 of FIG. 2, for boot components received in a DFU file at block 731. In one embodiment, the processing logic of process 700 determines if the computed digests match corresponding digests specified in the boot ticket (e.g. received from the recovery host) at block 729. In the case of any mismatch of digests at block 729, the processing logic of process 700 may continue receiving external commands and/or files at block 701. Otherwise, the processing logic of process 700 may proceed to perform restore operations 733 for booting a device. In one embodiment, a boot component such as an iBoot component or an iBSS component include implementations for the processing logic of process 700.

Figure 8:
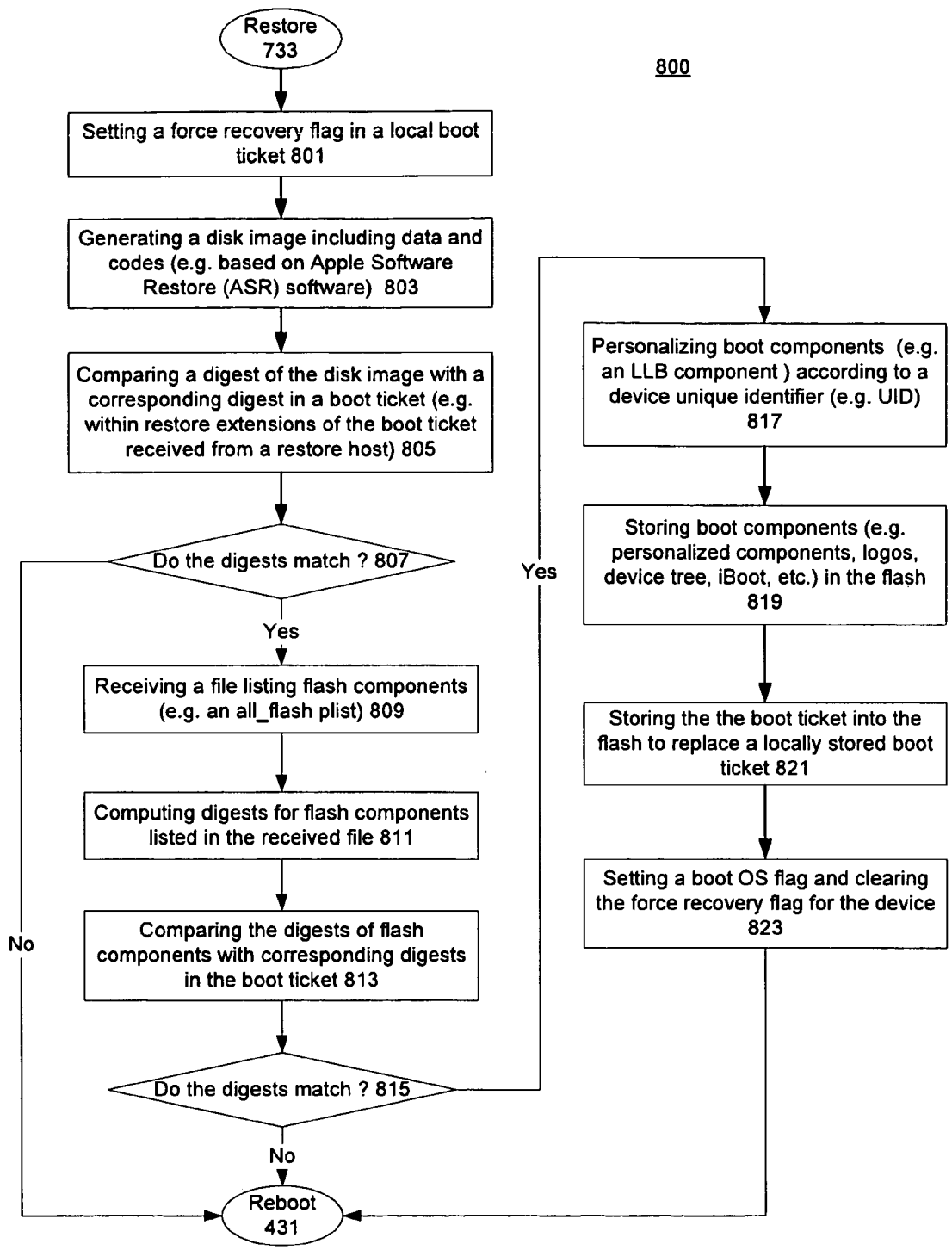
FIG. 8 is a flow diagram illustrating one embodiment of a process to install boot components personalized for booting a device according to a ticket.

FIG. 8 is a flow diagram illustrating one embodiment of a process 800 to install boot components personalized for booting a device according to a ticket. Exemplary process 800 may be performed by a processing logic that may comprise hardware (circuitry, dedicated logic, etc.), software (such as is run on a dedicated machine), or a combination of both. For example, process 800 may be performed by some components of system 200 of FIG. 2. In one embodiment, the processing logic of process 800 performs restore operations 733 for booting a device. At block 801, the processing logic of process 800 may set an FR flag in a local boot ticket, e.g. stored in a storage device such as mass storage 221 of FIG. 2. An FR flag may indicate an FR mode for a device when booting. In one embodiment, at block 803, the processing logic of process 800 may generate a disk image, e.g. based on ASR (Apple Software Restore) operations, for booting a device. A disk image may be a boot component including data and codes. At block 805, the processing logic of process 800 may compare a digest cryptographically generated from the disk image with a corresponding digest specified in a boot ticket (e.g. in an extension field of a boot ticket received from a recovery host). If the digests do not match at block 807, the processing logic of process 800 may proceed directly to perform reboot operations 431.

Otherwise, if there is a match between the generated disk image and the boot ticket, the processing logic of process 800 may receive a file including a list of flash components (e.g. an all_flash plist) at block 809. A flash component may be a boot component for booting a device. The processing logic of process 800 may compute (generate) a cryptographic digest for each listed flash component at block 811. In one embodiment, the processing logic of process 800 compares the digest for each flash component with a corresponding digest specified in the boot ticket at block 813. If any mismatch is detected at block 815, the processing logic of process 800 may proceed to perform reboot operations 431. Otherwise, at block 817, the processing logic of process 800 may personalize (e.g encrypt) one or more boot components (e.g. an LLB component) currently loaded in a memory according to a unique identifier, e.g. a UID in device identifiers 209 of FIG. 2. In one embodiment at block 819, the processing logic of process 800 may store boot components such as an LLB component (personalized), logo components, a device tree component, an iBoot component, etc., into a flash of the device, e.g. mass storage 221 of FIG. 2. Subsequently, the processing logic of process 800 may store a boot ticket (e.g. a current boot ticket received from a recovery host) from a memory into the flash to replace a locally stored boot ticket at block 821. The processing logic of process 800 may update boot flags for booting a device at block 823, such as boot flags 203 of FIG. 2. For example, the processing logic of process 800 may set (enable) a boot OS flag and clear an FR flag for reboot operations 431.

Figure 9:
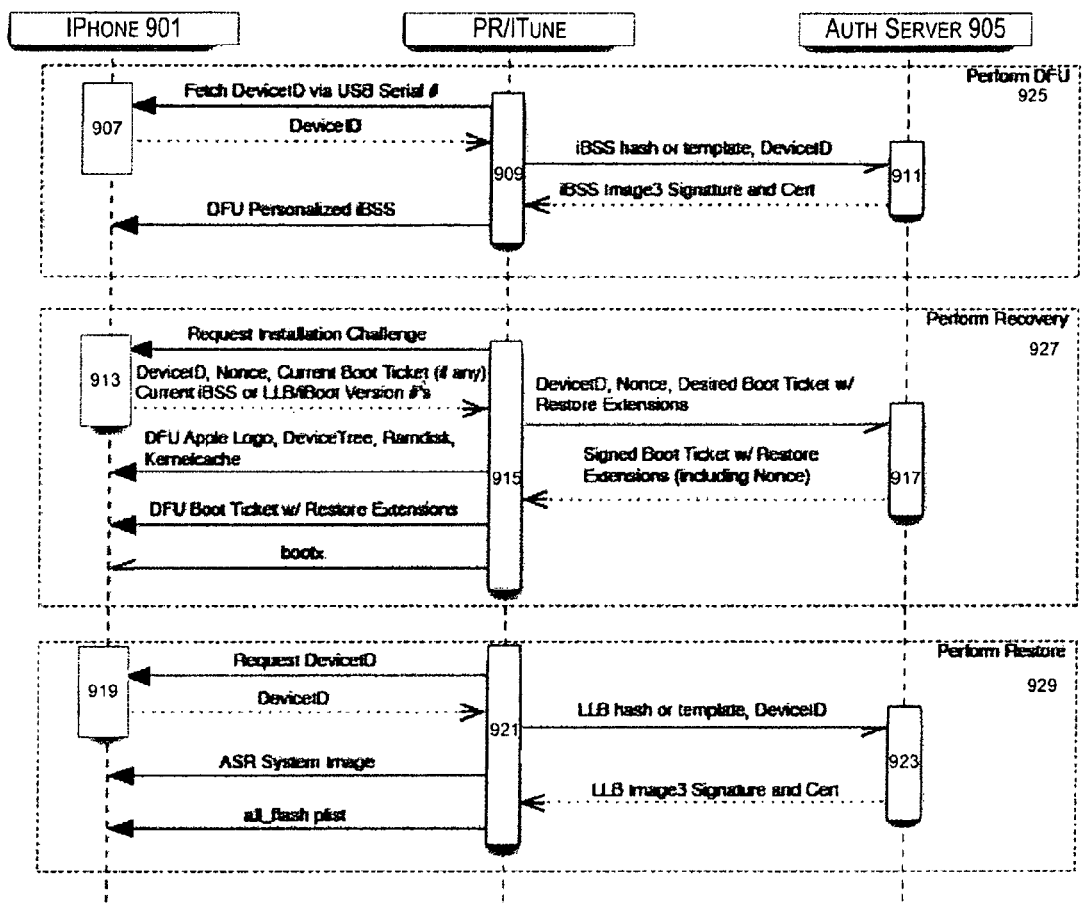
FIG. 9 is a sequence diagram illustrating one embodiment of a process to install boot components authorized by a ticket for booting a device.

FIG. 9 is a sequence diagram illustrating one embodiment of a process 900 to install boot components authorized by a ticket for booting a device. In one embodiment, IPhone 901 is a device booting to an operating state, such as device 115 of FIG. 1. PR/ITune 903 may be a host locally coupled with IPhone 901 via an USB connection. AuthServer 905 may be a server communicatively coupled with PR/ITune 903 over a network for signing a ticket, such as ticket authorization server 113 of FIG. 1. IPhone 901 may perform booting operations sequentially according to sequences DFU 925, Recovery 927 and Restore 929. In one embodiment, IPhone 901 may exchange messages, including commands and/or files, with PR/ITune 903 during sequences 907, 913 and 919 for booting operations. Likewise, PR/ITunes 903 communicates with IPhone 901 and AuthServer 905 during sequences 909, 915, and 921, including relaying messages, including a ticket request and a corresponding signed ticket, between IPhone 901 and AuthServer 905 which signs a ticket for personalizing IPhone 910 during sequence 917. In one embodiment, personalizing a boot component, e.g. an IBSS component or an LLB component, for IPhone 901 may include a signature signed by AuthServer 905 for the boot component according to a device ID of IPhone 901 and a hash of the boot component, such as performed during sequences 911 and 923 by AuthServer 905.

FIG. 10 is a sample format illustrating one example of a ticket to authorize boot components for booting a device, such as signed ticket 119 of FIG. 1. According to one embodiment, a ticket is signed by a trusted certificate (or key). A signature of a ticket may bind SHA1 digests or version identifiers of each system components or boot components for booting a device to a set of unique DeviceIDs for different processors in the device (or unit). In one embodiment, the signature also binds the digests used during installation to a nonce generated by an iBoot component or an iBSS component on the device, such that tickets cannot be used to re-install the same software more than once. A ticket may include a list of attribute fields 1001 specifying one or more name value pairs. A name value pair may include an explicit or implicit name tag. Referring to FIG. 10, tags 1003 may be implicitly specified according to the sequence of the attribute fields 1001.

Figure 11:
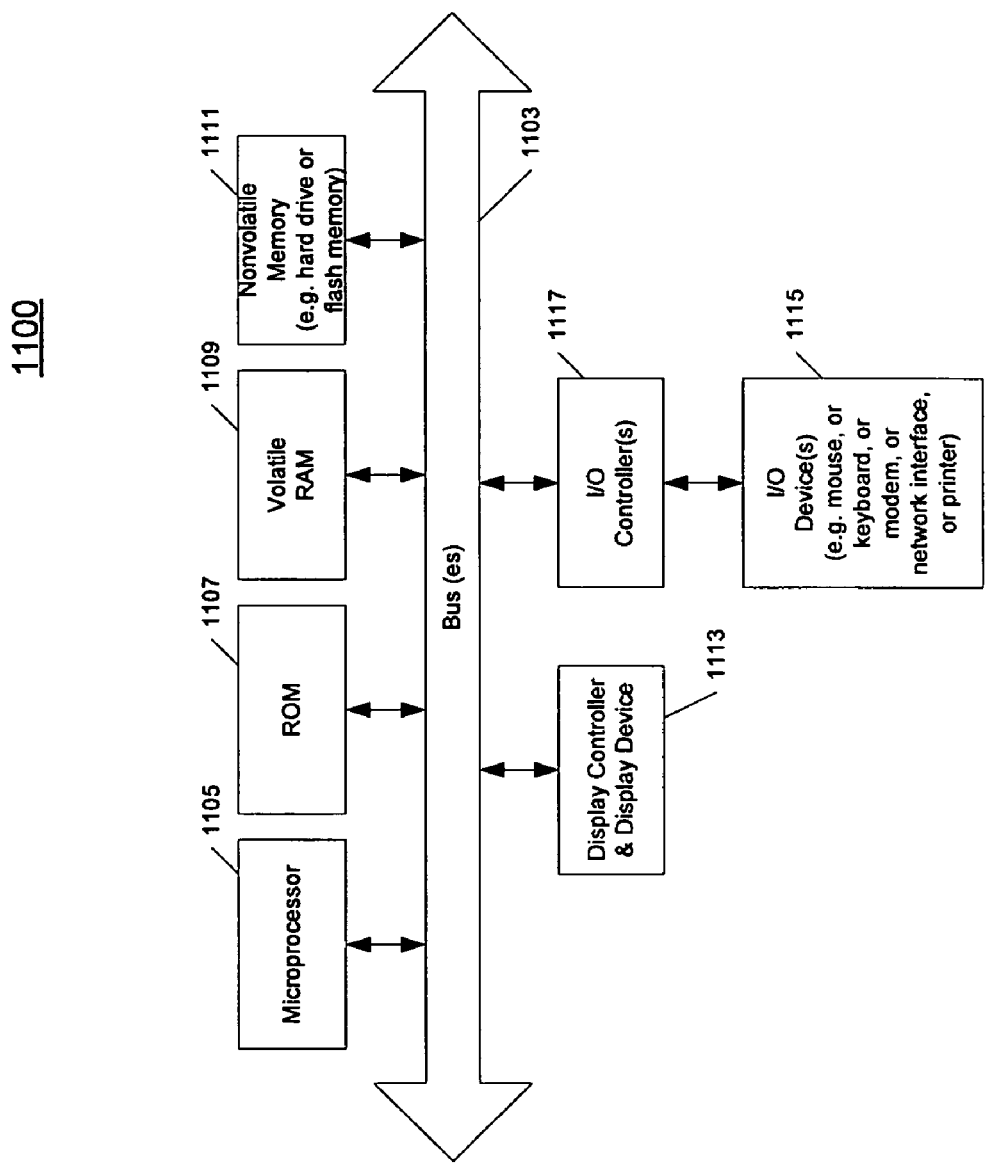
FIG. 11 illustrates one example of a typical computer system which may be used in conjunction with the embodiments described herein.

FIG. 11 shows one example of a data processing system 1100 which may be used with one embodiment the present invention. For example, the system 1100 may be implemented including a system as shown in FIG. 2. Note that while FIG. 11 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 11, the computer system 1100, which is a form of a data processing system, includes a bus 1103 which is coupled to a microprocessor(s) 1105 and a ROM (Read Only Memory) 1107 and volatile RAM 1109 and a non-volatile memory 1111. The microprocessor 1105 may retrieve the instructions from the memories 1107, 1109, 1111 and execute the instructions to perform operations described above. The bus 1103 interconnects these various components together and also interconnects these components 1105, 1107, 1109, and 1111 to a display controller and display device 1113 and to peripheral devices such as input/output (I/O) devices which may be mice, keyboards, modems, network interfaces, printers and other devices which are well known in the art. Typically, the input/output devices 1115 are coupled to the system through input/output controllers 1117. The volatile RAM (Random Access Memory) 1109 is typically implemented as dynamic RAM (DRAM) which requires power continually in order to refresh or maintain the data in the memory.

The mass storage 1111 is typically a magnetic hard drive or a magnetic optical drive or an optical drive or a DVD RAM or a flash memory or other types of memory systems which maintain data (e.g. large amounts of data) even after power is removed from the system. Typically, the mass storage 1111 will also be a random access memory although this is not required. While FIG. 11 shows that the mass storage 1111 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1103 may include one or more buses connected to each other through various bridges, controllers and/or adapters as is well known in the art.

Figure 12:
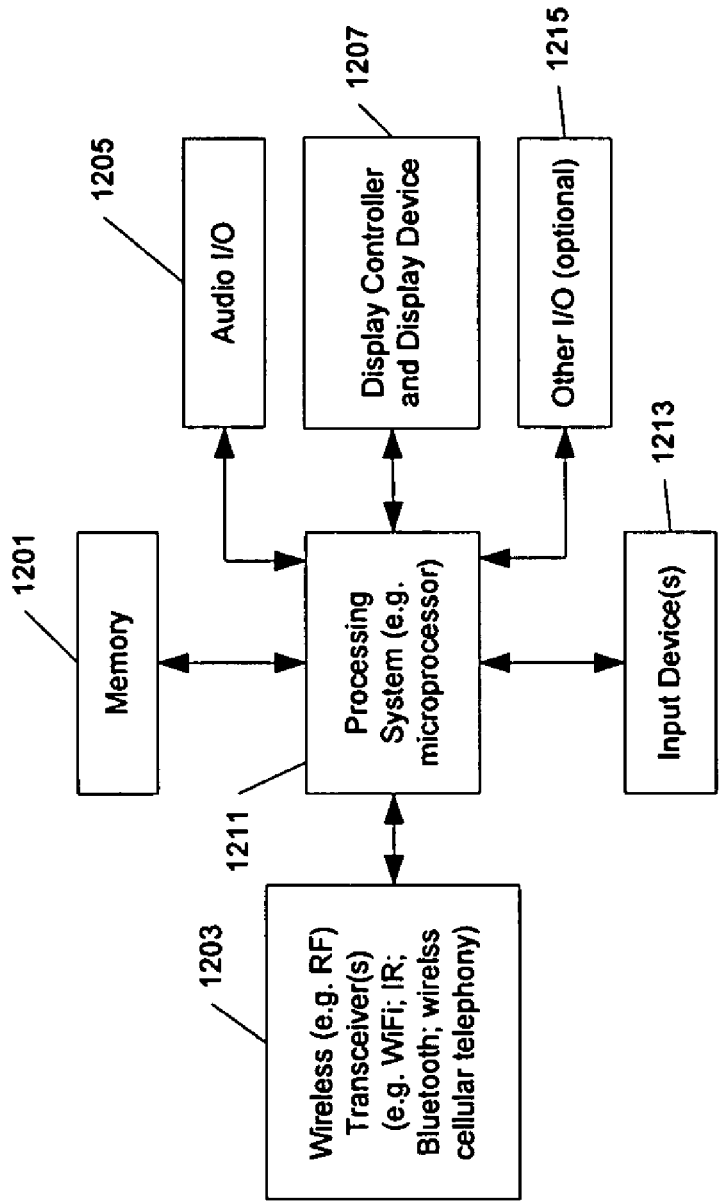
FIG. 12 shows an example of a data processing system which may be used with one embodiment of the present invention.

FIG. 12 shows an example of another data processing system 1200 which may be used with one embodiment of the present invention. For example, system 1200 may be implemented as part of system as shown in FIG. 2. The data processing system 1200 shown in FIG. 12 includes a processing system 1211, which may be one or more microprocessors, or which may be a system on a chip integrated circuit and the system also includes memory 1201 for storing data and programs for execution by the processing system. The system 1200 also includes an audio input/output subsystem 1205 which may include a microphone and a speaker for, for example, playing back music or providing telephone functionality through the speaker and microphone.

A display controller and display device 1207 provide a visual user interface for the user; this digital interface may include a graphical user interface which is similar to that shown on a Macintosh computer when running OS X operating system software. The system 1200 also includes one or more wireless transceivers 1203 to communicate with another data processing system, such as the system 1100 of FIG. 11. A wireless transceiver may be a WiFi transceiver, an infrared transceiver, a Bluetooth transceiver, and/or a wireless cellular telephony transceiver. It will be appreciated that additional components, not shown, may also be part of the system 1200 in certain embodiments, and in certain embodiments fewer components than shown in FIG. 12 may also be used in a data processing system.

The data processing system 1200 also includes one or more input devices 1213 which are provided to allow a user to provide input to the system. These input devices may be a keypad or a keyboard or a touch panel or a multi touch panel. The data processing system 1200 also includes an optional input/output device 1215 which may be a connector for a dock. It will be appreciated that one or more buses, not shown, may be used to interconnect the various components as is well known in the art. The data processing system shown in FIG. 12 may be a handheld computer or a personal digital assistant (PDA), or a cellular telephone with PDA like functionality, or a handheld computer which includes a portable gaming device, or a cellular telephone, or a media player, such as an iPod, or devices which combine aspects or functions of these devices, such as a media player combined with a PDA and a cellular telephone in one device. In other embodiments, the data processing system 1200 may be a network computer or an embedded processing device within another device, or other types of data processing systems which have fewer components or perhaps more components than that shown in FIG. 12.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple Computer, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in published U.S. patent application numbers 2003/0095096 and 2004/0224638, both of which are incorporated herein by reference.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)). The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus.

Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A computer implemented method, comprising:
   sending a ticket request for booting a device into an operating state, the ticket request identifying a collection of components previously authorized to boot the device, the ticket request including a unique identifier associated with the device;
   in response to receiving a ticket for the ticket request, cryptographically validating whether the ticket is authorized by a remote authorization server capable of personalizing the ticket for the device according to the unique identifier, the ticket identifying a separate collection of components for booting the device, the ticket including attributes for the separate collection of components, at least one of the separate collection of components not belonging to the collection of components previously authorized for the device, the collection of components including a particular component;
   determining, if the ticket is valid, if the particular component is invalidated via the attributes in the ticket; and
   executing the particular component based on the determination.

2. The method of claim 1, wherein the device stores one or more device identifiers including the unique identifier, and wherein
   the ticket request includes the one or more device identifiers.

3. The method of claim 2, further comprising:
   encrypting the particular component using the unique identifier; and
   storing the encrypted particular component in a storage of the device.

4. The method of claim 3, wherein the ticket request includes a raw ticket identifying attributes of components not personalized for a particular device, the method further comprising:
   retrieving the raw ticket and components not personalized for a particular device from a hosting server.

5. The method of claim 2, wherein the ticket includes a signature and a chain of certificates, and wherein validating the ticket comprises:
   decrypting the signature according to the unique identifier;
   generating a ticket digest cryptographically from the ticket; and
   decrypting the decrypted signature according to a cryptographic key verified using the chain of certificates.

6. The method of claim 2, wherein the ticket includes a challenge number and wherein the ticket request includes a random number, the method further comprising:
   generating the random number on the fly; and
   comparing the challenge number and the random number.

7. The method of claim 2, wherein the attributes include a digest attribute, and wherein the determination comprises:
   generating a component digest cryptographically from the particular component; and
   comparing the digest attribute with the generated component digest.

8. The method of claim 2, wherein the attributes include a version attribute, and wherein the determination comprises:
   comparing the version attribute with a version attribute of the particular component.

9. The method of claim 1, wherein executing the particular component comprises:
   determining a subsequent component from the separate collection of components;
   matching the subsequent component with the ticket; and
   executing, if the subsequent component matches the ticket, the subsequent component for booting the device.

10. The method of claim 9, wherein determining the subsequent component is based on an external notification received.

11. The method of claim 9, wherein determining the subsequent component is based on a pointer stored inside the particular component.

12. The method of claim 1, wherein the attributes in the ticket include a first value for a particular attribute of the particular component, wherein the particular component includes a second value for the particular attribute, and wherein the determination of the validity of the particular component depends on whether the first value matches the second value.

13. A computer implemented method, comprising:
    retrieving a boot package from a hosting server for booting a device into an operating state not personalized for the device, the boot package including a raw ticket having a plurality of attributes identifying the plurality of components;
    sending a ticket request to a remote authorization facility over a network for a ticket to personalize the device, the ticket request including the raw ticket and a unique device identifier for the device; and
    in response to receiving a ticket for the ticket request from the remote authorization facility, selecting one or more components from the plurality of components for booting the device, wherein the ticket identifies a collection of components personalized for the device according to the unique device identifier, the collection of components including at least one component not belonging to the plurality of components.

14. The method of claim 13, wherein the ticket includes a signature, wherein the device stores a root public key, the method further comprising:
    cryptographically validating the signature of the ticket according to the unique device identifier and the root public key.

15. The method of claim 14, wherein the ticket includes a digest for each selected component, wherein the package includes the plurality of components, and wherein selecting the one or more components comprises:
    generating cryptographically a digest for the selected component; and
    comparing the generated digest with the digest for to the selected component in the ticket.

16. A machine-readable storage medium having instructions, which when executed by a machine, cause a machine to perform a method, the method comprising:
    sending a ticket request for booting a device into an operating state, the ticket request identifying a collection of components previously authorized to boot the device, the ticket request including a unique identifier associated with the device;

in response to receiving a ticket for the ticket request, cryptographically validating whether the ticket is authorized by a remote authorization server capable of personalizing the ticket for the device according to the unique identifier, the ticket identifying a separate collection of components for booting the device, the ticket including attributes for the separate collection of components, at least one of the separate collection components not belonging to the collection of components previously authorized for the device, the collection of components including a particular component;

determining, if the ticket is valid, if the particular component is invalidated via the attributes in the ticket; and executing the particular component based on the determination.

17. A machine-readable storage medium having instructions, which when executed by a machine, cause a machine to perform a method, the method comprising:

retrieving a boot package from a hosting server for booting a device into an operating state not personalized for the device, the boot package including a raw ticket having a plurality of attributes identifying the plurality of components;

sending a ticket request to a remote authorization facility over a network for a ticket to personalize the device, the ticket request including the raw ticket and a unique device identifier for the device; and in response to receiving a ticket for the ticket request from the remote authorization facility, selecting one or more components from the plurality of components for booting the device, wherein the ticket identifies a collection of components personalized for the device according to the unique device identifier, the collection of components including at least one component not belonging to the plurality of components.

18. A computer implemented method, comprising:

in response to receiving a ticket request identifying a group of boot components and a remote device, personalize a collection of boot components for the remote device to boot into an operating state according to the ticket request, wherein the collection of boot components and the group of boot components differ by at least a particular one of the collection of boot components;

generate a ticket including one or more attributes to authenticate the personalized collection of boot components for the device, the one or more attributes including at least one cryptographic signature for validating the ticket; and sending the ticket to the remote device.

19. The method of claim 18, wherein the ticket request includes one or more identifiers for the remote device, where the group of boot components includes a particular boot component, and wherein the personalizing the collection of boot components comprises:

determining whether the particular boot component is allowed for the remote device based on a ticket signing configuration and the identifiers, the ticket signing configuration configuring which combinations of boot components are authorized for the remote device;

generating, if the particular boot component is allowed according to the configured combinations of boot components for the remote device in the ticket signing configuration, a cryptographic hash from the particular boot component; and encrypting the cryptographic hash based on the ticket request, wherein the one or more attributes include the encrypted cryptographic hash for the particular boot component.

20. The method of claim 19, where in the ticket signing configuration includes a wildcard specified for the particular boot component, and wherein the particular boot component is allowed regardless of the one or more identifiers.

21. The method of claim 18, wherein the ticket request includes a nonce and wherein generating the ticket comprises:

copying the nonce to one of the one or more attributes in the ticket.

* * * * *

UNITED STATES PATENT AND TRADEMARK OFFICE
CERTIFICATE OF CORRECTION

PATENT NO. : 8,095,799 B2  Page 1 of 1
APPLICATION NO. : 12/329377
DATED : January 10, 2012
INVENTOR(S) : Jerry Hauck et al.

It is certified that error appears in the above-identified patent and that said Letters Patent is hereby corrected as shown below:

In the Claims

Column 17, line 51 (Claim 4, line 3): "a particular device" should read --the particular device--.

Column 18, line 35 (Claim 13, line 5): "the plurality" should read --a plurality--.

Column 19, line 25 (Claim 17, line 7): "the plurality" should read --a plurality--.

Signed and Sealed this
Twenty-first Day of October, 2014

Michelle K. Lee
*Deputy Director of the United States Patent and Trademark Office*